Oct. 11, 1955 L. B. COVEY 2,720,436
COLLAPSIBLE TABLE FOR THE BACK OF A SEAT
Filed July 29, 1953
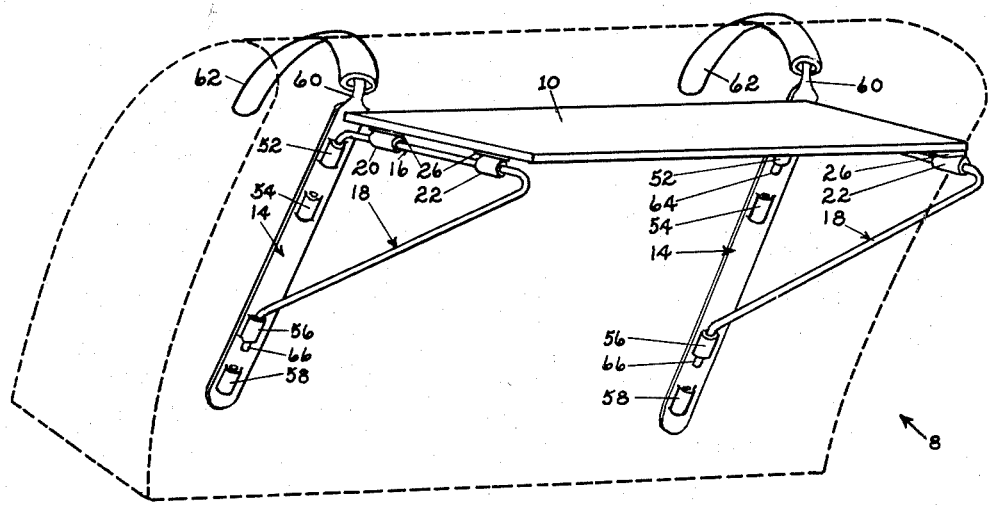
Fig.1.
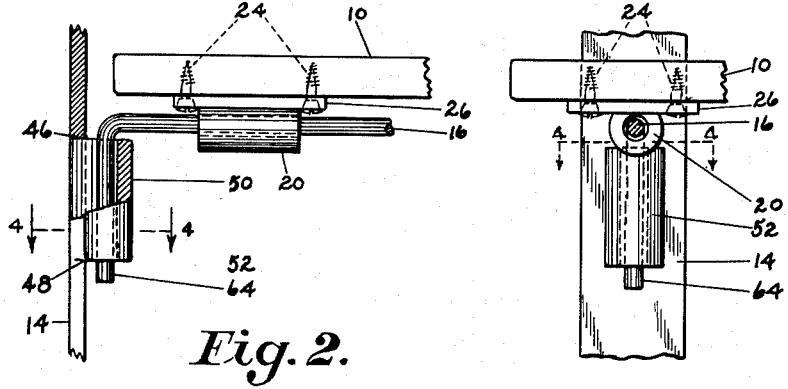
Fig.2.
Fig.3.
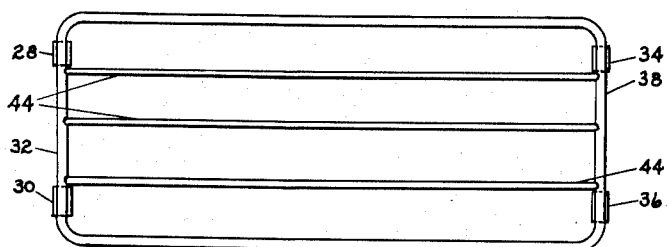
Fig.5.
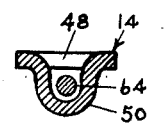
Fig.4.
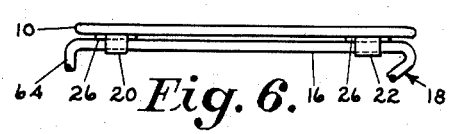
Fig.6.
INVENTOR
LURANA COVEY.
By Arthur H. Sturges.
ATTORNEY

United States Patent Office 2,720,436
Patented Oct. 11, 1955

2,720,436

COLLAPSIBLE TABLE FOR THE BACK OF A SEAT

Lurana B. Covey, La Plata County, Colo.

Application July 29, 1953, Serial No. 370,996

1 Claim. (Cl. 311—21)

This invention relates to motor vehicle accessories of the type used inside of pleasure vehicles, and in particular a table, shelf, or rack temporarily supported by hangers against the back of the front seat of a vehicle, the hangers being supported by hooks at the upper ends which are adapted to be positioned over the upper edge of the back of a seat and a panel forming the table or the rack being supported on the hangers by brackets.

The purpose of this invention is to provide a table or the like that is adapted to be suspended from the back of the front seat of a motor vehicle in which the device is adapted to be collapsed to facilitate passing through doors of the vehicle.

Various types of brackets and hangers have been provided for suspending tables, racks and trays from the backs of the front seats of motor vehicles, however, it seems difficult to provide supporting means for a panel that permits the parts to be folded so that they may be placed in and removed from a vehicle of the pleasure type which also provides means for holding a table with sufficient rigidity to permit the table to be used for holding drinks and other food products.

With this thought in mind this invention contemplates a combination bracket and hanger for suspending a panel or rack on the back of a seat in which the hanger is positively secured in position on the back of a seat with a hook-like element extended from the upper end and in which a bracket, pivotally connected to a panel, is supported on the hanger at two vertically spaced points.

The object of this invention is, therefore, to provide a hanger and a bracket for suspending a panel or rack from the back of a vehicle seat which supports the device with such rigidity that it may be used as a table for lunching and the like.

Another object of the invention is to provide a supporting structure for a table or the like in which the table may be suspended from the back of a seat without being permanently attached to the vehicle and without damaging seat covers or the like of the vehicle.

Another important object is to provide a collapsible table for use in motor vehicles of the pleasure type in which the table folds to permit easy passage thereof through doors of the vehicle.

A further object of the invention is to provide a collapsible table for use in motor vehicles particularly of the pleasure type in which the table is supported on the back of the front seat of the vehicle, and in which the elevation of the table is adjustable.

A still further object of the invention is to provide a collapsible table or rack for use on the back of the front seat of a vehicle in which the device may readily be taken apart and may also be readily set up for use.

With these and other objects and advantages in view the invention embodies a pair of vertically disposed bars having vertically spaced sockets struck therefrom and extended from outer surfaces thereof with hooks having tubular fabric covers extended from the upper ends for supporting the bars from the upper edge of the back of a seat, and brackets having horizontally disposed upper sections pivotally mounted on the under surface of a panel and spaced from the ends thereof and diagonally positioned sections extended downwardly and forwardly from extended ends of the horizontal sections, and with ends of the horizontal and diagonally disposed sections adapted to be positioned in the sockets struck from the bars.

Other features and advantages of the invention will appear from the following description taken in connection with the drawings, wherein:

Figure 1 is a perspective view illustrating the improved car table or rack showing the device on the back of a seat, the seat being shown in dotted lines.

Figure 2 is a detail with the parts shown on an enlarged scale, showing the connection between the upper inner corner of the bracket and hanger with parts broken away and with parts shown in section.

Figure 3 is an elevational view of an end of the table showing a portion of the hanger and with the upper horizontal section of the bracket shown in section.

Figure 4 is a sectional plan taken on line 4—4 of Figure 2 showing an end of the bracket in one of the sockets of the hanger.

Figure 5 is a plan view of a rack adapted to be supported by the brackets and hangers in place of the panel forming the table.

Figure 6 is an end elevational view of the panel forming the table, showing the upper horizontal section of one of the brackets with the brace of the bracket broken away.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention, it remains obvious that it may be employed in any other capacity wherein it may be found applicable.

In the acompanying drawings, and in the following specification, the same reference characters are used to designate the same parts and elements throughout, and in which the numeral 8 refers to the invention in its entirety, numeral 10 indicates a panel adapted to form a table, numeral 12, a rack, numeral 14 a bar forming the vertical section of a hanger, numeral 16 a horizontal section of a bracket, and numeral 18 a diagonal brace of the bracket.

As shown in Figure 1, each end of the panel 10 is provided with bearings 20 and 22 which are secured to the panel with screws or fasteners 24 that extend through a base 26, and the horizontal sections of the brackets extend through the bearings providing means for pivotally connecting the brackets to the panel, whereby the brackets are adapted to fold against the under surface of the panel.

Bearings 28 and 30, which are similar to the bearings 20 and 22, are provided on a rail 32 at one end of the rack 12 and similar bearings 34 and 36 are positioned on a rail 38 at the opposite end, and it will be understood that horizontal sections of brackets, similar to the sections 16 extend through the bearings of the rack. The rack 12 also includes side rails 40 and 42 connecting the ends of the end rails 32 and 38 and spaced intermediate rods 44.

The bars 14 of the hangers are provided with vertically spaced pairs of slits 46 and 48 and the material 50 between the slits is stamped outwardly providing upper sockets 52 and 54, and lower sockets 56 and 58. Similar sockets are provided in the other hanger.

Hooks 60, which are semi-circular in cross section, extend from the upper ends of the bars 14 and the hooks are provided with tubular covers 62, that may be made of fabric, felt, plastic, or other suitable material, that prevents tearing or scratching the material of the seat covers.

The extended ends of the horizontal sections 16 of the brackets are provided with downwardly disposed portions 64 that are positioned to be held in the upper sockets of the hangers, and similar portions 66 extend from the lower ends of the diagonally positioned braces 18, the portions 66 being adapted to be held in the lower sockets of the hangers.

With the parts formed and assembled in this manner the brackets fold against the under surfaces of the panel or rack when the device is not in use and when it is desired to use the device as a table the hangers are positioned on the back of a seat of a vehicle with the hooks extended over the upper edge of the back and with the bars 14 resting against the rear surface of the back, and with the hangers in position the brackets are opened away from the panel and the portions 64 and 66 inserted in upper and lower sockets of the hangers, as shown in Figure 1. The elevation of the panel or tbale may be adjusted by inserting the portions 64 and 66 in different sets of sockets.

The device is adapted to be used as a rack in the same manner, using the rack 12 shown in Figure 5, instead of the panel.

The device is also adapted to be folded and placed in a comparatively narrow area when not in use.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and arrangement of details and parts, such as come within the purview of the invention claimed may be resorted to in actual practice, if desired.

Having now described the invention that which is claimed to be new and desired to be procured by Letters Patent, is:

In a collapsible attachment for use on the back of a motor vehicle seat, the combination which comprises vertically disposed bars having vertically spaced aligned cylindrical sockets extended from faces thereof, said bars having hooks extended from the upper ends and said hooks extending over the back of a seat for supporting the bars whereby the hooks with the bars provide hangers, the width of the hooks being less than that of the lower portions of the bars, tubular covers of flexible material positioned on said hooks, a table having aligned transversely disposed cylindrical sockets spaced inwardly from the ends and positioned on the lower surface thereof, and braces having horizontally disposed sections extended through the cylindrical sockets of the table and diagonally disposed sections extended downwardly from the extended ends of the horizontally disposed sections, and the inner ends of the horizontally disposed sections and diagonally disposed sections having depending aligned portions positioned in the cylindrical sockets of the bars for supporting the table in a horizontally disposed position, said braces folding to nested positions against the under surface of the table for collapsing the device.

References Cited in the file of this patent

UNITED STATES PATENTS

| | | |
|---|---|---|
| 449,134 | Porter | Mar. 31, 1891 |
| 655,715 | Kessler | Aug. 14, 1900 |
| 747,614 | Krabach | Dec. 22, 1903 |
| 1,232,874 | Whealen | July 10, 1917 |
| 2,179,273 | Ponten et al. | Nov. 7, 1939 |
| 2,503,602 | Titley | Apr. 11, 1950 |
| 2,530,632 | Scherstuhl | Nov. 21, 1950 |
| 2,534,952 | Comer | Dec. 19, 1950 |

FOREIGN PATENTS

| | | |
|---|---|---|
| 5,538 | Great Britain | 1894 |